Aug. 19, 1969  A. O. JANSSON  3,461,637
INSULATED MOLDING FASTENER
Filed April 10, 1964
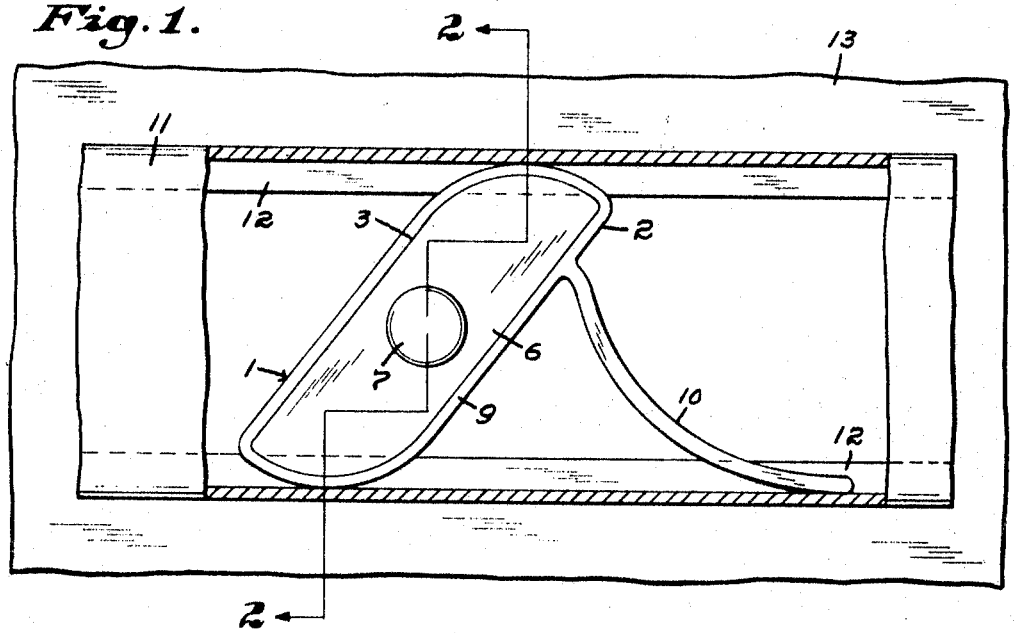
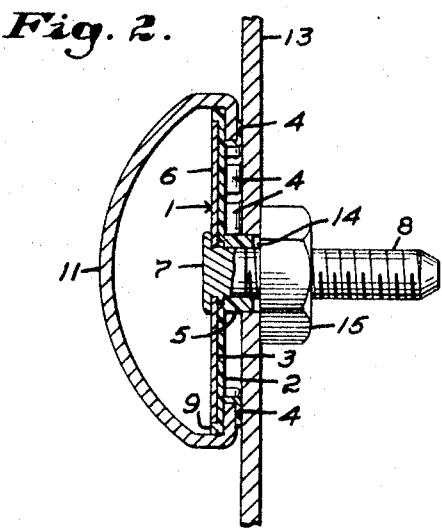
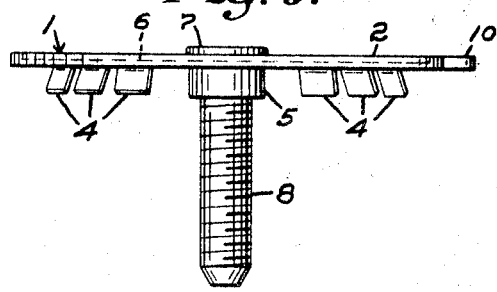
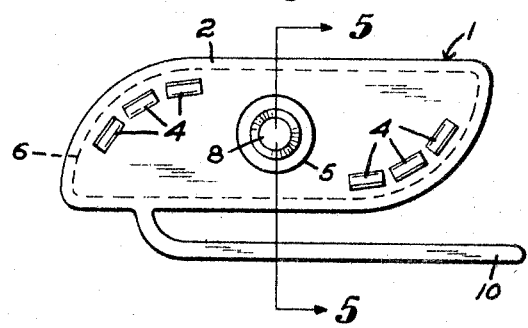
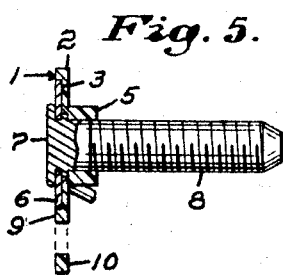
Inventor:
Arnold O. Jansson,
by Philip E. Parker
Att'y.

3,461,637
INSULATED MOLDING FASTENER
Arnold O. Jansson, Arlington, Mass., assignor, by mesne assignments, to United-Carr Incorporated, Boston, Mass., a corporation of Delaware
Filed Apr. 10, 1964, Ser. No. 358,852
Int. Cl. E04c *2/38;* E04f *19/02;* F16b *23/00*
U.S. Cl. 52—718                                      8 Claims The present invention relates generally to fasteners and more specifically to a fastener for securing a molding to the body of an automobile or other articles of commerce.

Patent No. 2,709,286, issued May 31, 1955, exemplifies a type of fastener which is designed for use in such an application.

While this fastener has proved quite effective as a device for securing the molding, it nevertheless has one series defect: i.e., since the molding, the fastener and the body panel of the vehicle or appliance are usually constructed of dissimilar metals, an electrolytic reaction develops between same when they are in contact and subject to the elements. Thus, the vehicle body, etc. becomes corroded at a number of points adjacent the molding.

Patent No. 3,059,739, issued Oct. 23, 1962, represents an attempt to overcome the corrosion problem outlined above, but it has proved to be a relatively expensive solution in that substantial time and effort is required to install the extruded insulating material, much of which is unnecessary since the fasteners are used only at selectively spaced intervals.

Other attempts to rectify the corrosion problem have resulted in all plastic fasteners employing tabs similar to those of the present invention to isolate the molding from the vehicle body. However, strength and holding power in the fastener have been sacrificed in that the more resilient plastics tend to bend or buckle when subjected to vibration and the pressure exerted by the molding, while rigid plastics are likely to break or crack when subjected to shock or continuous vibration.

Thus an object of the invention is to provide a molding fastener possessing substantial strength and holding power and means to prevent corrosion causing metal-to-metal contact between the parts which are fastend.

A further object is to provide an inexpensive molding fastener having molding, support and fastener isolating means which may be installed in a single operation.

Other objects and advantages of the invention will become evident from a reading of the following detailed description in conjunction with the accompanying drawings in which:

FIG. 1 is a top plan view of an installation showing a molding attached to a support by the novel fastener with the molding being partially broken away;

FIG. 2 is a section taken on line 2—2 of FIG. 1;

FIG. 3 is a side elevation of the fastener;

FIG. 4 is a bottom plan view of the fastener; and

FIG. 5 is a section taken on line 5—5 of FIG. 4.

One form of the novel fastener 1 is best depicted in FIGS. 3, 4 and 5 and consists of a molded plastic cross plate having an integral wing extending therefrom; and a metal plate and bolt in combination with the cross plate.

The flexible molded plastic cross plate or encasement 2 has generally parallel sides and rounded arcuate ends. A hollow recess 3 which is of the same geometric configuration as the plate 2 is formed in one face thereof. Two separate series of tabs 4, which are integrally connected to the plastic cross plate 2, extend outwardly at an angle from the face of the plate 2 opposite the recess 3.

The plate 2 has a central aperture defined by the internal walls of a tubular extension 5 which is integrally molded to and extends outwardly from the face of the plate oposite the recess 3.

The thin, rigid, metal cross plate 6 is seated in the recess 3 in the plastic cross plate 2 and has a bolt 7 staked thereto. The threaded shank 8 of the bolt 7 passes through the plastic tubular extension 5 and makes a tight pressed fit therewith to maintain the parts in assembly.

It should be noted that the area and thickness of the metal plate 6 are shown to be equal to the area and depth of the recess 3, leaving a narrow plastic lip 9 completely surrounding the metal cross plate 6.

The flexible plastic wing 10 is molded integral with the plastic cross plate 2 and extends generally parallel the cross plates 2 and 6.

FIGS. 1 and 2 depict an installation including the fastener 1 securing a molding 11 having opposed inturned flanges 12 to the support 13.

In the installation the cross plates 2 and 6 are seated between the molding 11 and the flanges 12; and the wing 10 is positioned such that its free end engages an inner surface of the molding adjacent one of the flanges 12. Since the side wing 10 is in tension, it continues to rotatably urge the plates 2 and 6 into the position shown in FIG. 1 such that the fastener may be moved along the molding to any desired position prior to being secured to the support 13.

To secure the molding the tubular extension 5 is seated in the aperture 14 in the support 13 and a nut 15 is torqued onto the shank 8 of the bolts 7. As the nut 15 is tightened the flanges 12 of the molding 11 are drawn towards the support 13 and at least two of the tabs 4 (one of each series) are trapped between the flanges 12 and the support 13.

Thus as is readily observed from a viewing of FIG. 2 the molding is effectively isolated from the support 13, the metal cross plate 6 is isolated from the molding and the shank 8 of the bolt 7 is isolated from any contact with the support 13.

It would also be well to point out that the tubular plastic extension 5 is slightly compressed between the shank 8 of the bolt and the internal walls of the support 13 defining the aperture 14. The extension 5 therefore acts as a sealing means to prevent the egress of rust-inducing moisture or other foreign matter into the interior of the molding.

Further as clearly shown in FIG. 1 the metal cross plate 6 spans the distance between the inturned flanges 12 of the molding an imparts substantially increased strength to the molding engaging part of the fastener.

I claim:

1. An installation comprising in combination an apertured support, a molding having opposed inturned flanges and a fastener securing said molding to said support, at least said molding and said support being of dissimilar metals which might become corroded if in contact with one another under corrosion causing conditions, said fastener including a molding engaging member of flexible, noncorrodible material spanning the distance between said inturned flanges, a rigid reinforcing member of corrodible material encompassed by the portions of said molding engaging member which engage said molding, said reinforcing member being substantially coextensive with said molding engaging member to resist flexing of said molding engaging member, means located behind the support securing the fastener to the support, and means associated with said molding engaging member isolating the engaged portions of said molding from said support.

2. An installation according to claim 1 wherein said fastener has a flexible spring arm attached to one of said members rotatably urging said members into a molding engaging attitude.

3. An installation according to claim 1 including a sealing means, located at the side of said molding engaging member adjacent said support, sealing the aperture in said support.

4. An installation according to claim 1 wherein the means isolating the engaged portions of said molding from said support is a plurality of flexible tabs extending from the side of said molding engaging member adjacent said support, portions of said tabs being disposed between the inturned flanges of said molding and said support.

5. An installation according to claim 1 wherein said molding engaging member completely encompasses said reinforcing member.

6. A device for securing a molding to an apertured support comprising an apertured molding engaging member of flexible, noncorrodible material, said molding engaging member including an elongated base portion, upstanding, generally parallel side portions and upstanding arcuate end portions, an apertured, elongated, rigid, reinforcing member having generally parallel side portions and arcuate end portions overlying and engaging the base portion of said molding engaging member and being substantially coextentive therewith, said side portions and end portions of said molding engaging member being located adjacent the peripheral edges of said reinforcing member, and a fastener member, said fastener member having a head portion overlying a relatively small surface of said reinforcing member adjacent the aperture therein and a shank portion extending from said head portion through the aperture in said reinforcing member and the aperture in said molding engaging member.

7. A molding installation comprising, in combination,
a panel having an aperture therein,
a molding strip having inwardly turned flanges along its longitudinal edges, and
a retainer assembly for holding said molding strip on said panel;
said retainer assembly comprising a plate portion extending from flange to flange of said molding strip in internal overlapping relationship thereto,
a shank portion projecting from one face of said plate portion and extending through said panel aperture,
and a plastic encasement encompassing at least said one face of said plate portion and the peripheral edges thereof,
said encasement having a hollow shoulder portion through which said shank portion extends,
said encasement insulating said plate portion from said molding strip at the areas of overlap and between the peripheral edges and abutting surfaces of the plate portion and molding strip internally of the latter;
and maens engaging said shank portion to prevent withdrawal of the latter from said panel aperture.

8. A molding installation according to claim 7 in which said encasement has a resilient arm integral with and extending from an edge thereof for biasing said encasement and plate portion about the axis of said shank portion toward said flange overlapping relationship.

References Cited
UNITED STATES PATENTS

| 3,137,048 | 6/1964 | Bedford | 189—88 X |
| 3,141,209 | 7/1964 | Van Buren | 24—73 |

ALFRED C. PERHAM, Primary Examiner

U.S. Cl. X.R.

24—73; 85—9; 287—53